United States Patent
Hooijschuur et al.

(10) Patent No.: US 7,928,705 B2
(45) Date of Patent: Apr. 19, 2011

(54) SWITCHED MODE VOLTAGE CONVERTER WITH LOW-CURRENT MODE AND METHODS OF PERFORMING VOLTAGE CONVERSION WITH LOW-CURRENT MODE

(75) Inventors: Franciscus N. M. Hooijschuur, Emmen (NL); Jacobus Haartsen, Hardenberg (NL); Tjapko Uildriks, Anderen (NL)

(73) Assignee: Sony Ericsson Mobile Communications AB, Lund (SE)

( * ) Notice: Subject to any disclaimer, the term of this patent is extended or adjusted under 35 U.S.C. 154(b) by 475 days.

(21) Appl. No.: 12/145,168

(22) Filed: Jun. 24, 2008

(65) Prior Publication Data

US 2009/0230934 A1 Sep. 17, 2009

Related U.S. Application Data

(60) Provisional application No. 61/035,821, filed on Mar. 12, 2008.

(51) Int. Cl.
*G05F 1/59* (2006.01)
(52) U.S. Cl. ........................ 323/272; 323/282; 323/351
(58) Field of Classification Search .................. 323/268, 323/272, 282, 351; 307/109
See application file for complete search history.

(56) References Cited

U.S. PATENT DOCUMENTS

| | | | |
|---|---|---|---|
| 6,169,392 B1 | 1/2001 | Kitagawa | |
| 6,429,632 B1 * | 8/2002 | Forbes et al. | 323/282 |
| 7,064,531 B1 | 6/2006 | Zinn | |
| 7,095,216 B2 * | 8/2006 | Matsuo et al. | 323/267 |
| 2002/0109488 A1 * | 8/2002 | Umeda | 323/268 |
| 2002/0167827 A1 * | 11/2002 | Umeda et al. | 363/59 |
| 2003/0057929 A1 * | 3/2003 | Suzuki et al. | 323/282 |
| 2005/0242792 A1 | 11/2005 | Zinn | |
| 2008/0054862 A1 | 3/2008 | Hara et al. | |
| 2009/0230934 A1 * | 9/2009 | Hooijschuur et al. | 323/282 |
| 2010/0156368 A1 * | 6/2010 | Huynh et al. | 323/282 |

FOREIGN PATENT DOCUMENTS
EP 1 681 760 A 7/2006

OTHER PUBLICATIONS

International Search Report and Written Opinion corresponding to International Application No. PCT/IB2008/053700, mailed Jul. 24, 2009.

* cited by examiner

*Primary Examiner* — Jeffrey L Sterrett
(74) *Attorney, Agent, or Firm* — Myers Bigel Sibley & Sajovec

(57) ABSTRACT

A voltage conversion circuit for a host electronic device includes a buck converter circuit having an input terminal coupled to a first node and having an output terminal coupled to a second node, a switched capacitor voltage converter circuit having an input coupled to the first node and an output coupled to the second node. The buck converter circuit may be configured to be selectively enabled and disabled in response to a control signal, and the switched capacitor voltage converter circuit may be configured to operate when the buck converter circuit is disabled.

20 Claims, 8 Drawing Sheets

SWITCHED MODE VOLTAGE CONVERTER WITH LOW-CURRENT MODE AND METHODS OF PERFORMING VOLTAGE CONVERSION WITH LOW-CURRENT MODE

CROSS REFERENCE TO RELATED APPLICATION

The present application claims the benefit of and priority to U.S. Provisional Patent Application No. 61/035,821, filed Mar. 12, 2008, entitled "SWITCHED MODE VOLTAGE CONVERTER WITH LOW-CURRENT MODE," the disclosure of which is hereby incorporated herein by reference in its entirety.

BACKGROUND

The present invention relates to electronic circuitry, and more particularly, to voltage converter circuits for electronic circuitry.

Digital electronic circuitry, such as CMOS circuitry used in radio systems, is typically powered by a very stable supply voltage. Typically, a voltage of 1.8V is required. The nominal voltage of some batteries used in electronic devices, such as lithium batteries, can be too high (e.g., 3.3V-4.2V), and may not be sufficiently stable for direct use as a power supply voltage. Furthermore, the voltage output by a battery drops as the battery is discharged. Therefore, a voltage converter can be used that receives an input voltage signal from the battery and generates a stable voltage at a desired voltage level that can be used as a power supply voltage for an electronic circuit. A conventional voltage converter typically includes two stages, namely, a step-down (or buck) converter that transforms the input battery voltage to a fixed lower voltage which is just sufficient to provide the supply voltage to the second stage, and a Low-Drop Out (LDO) regulator circuit that receives the lower voltage from the step-down converter and responsively provides a stable output voltage of, for example, 1.8V.

Two stages may be used instead of one, because a buck converter can make an efficient conversion from high to low voltage, but the voltage output by a buck converter can have too much voltage ripple to directly supply some CMOS circuitry. The LDO regulator can provide a clean output voltage having low ripple. However, the LDO regulator can have poor efficiency when connected directly to a high battery voltage.

The efficiency of the buck converter is typically optimized for large load currents. As the load current is reduced, the efficiency of the buck converter decreases as well. Also, leakage currents in the buck converter can start to play a role at low load currents. This is due to the complex circuitry in the buck converter. Existing buck converter circuits can be operated in a "pulse frequency" mode that can reduce the drop in efficiency at low output currents. However leakage current may still be present, since the complex circuitry that maintains an accurate output voltage is still enabled. The problem of leakage current can reduce the standby time of some electronic devices to less than half of what would be possible if the leakage current were not present.

SUMMARY

Some embodiments provide a voltage conversion circuit for a host electronic device, including a buck converter circuit having an input terminal coupled to a first node and having an output terminal coupled to a second node, a switched capacitor voltage converter circuit having an input coupled to the first node and an output coupled to the second node. The buck converter circuit may be configured to be selectively enabled and disabled in response to a control signal, and the switched capacitor voltage converter circuit may be configured to repetitively switch between charging a capacitor through the first node and discharging the capacitor through the second node while the buck converter circuit is disabled and to cease discharging the capacitor through the second node while the buck converter is enabled. The voltage conversion circuit may further include a voltage regulator circuit including an input terminal coupled to the second node.

The buck converter circuit may include an enable input coupled to a control line, and the buck converter circuit may be configured to be selectively enabled and/or disabled in response to a control signal on the control line.

The capacitor may be a second capacitor, and the switched capacitor voltage converter circuit may include a switch and a first capacitor coupled between the second node and ground. The switch may be configured to controllably connect the second capacitor to the first node or to the second node.

The switched capacitor voltage converter circuit may further include a switch control circuit that is configured to control a state of the switch. The switch control circuit may include a comparator including a noninverting input, an inverting input, and an output, and a reference voltage coupled to the inverting input of the comparator. The noninverting input may be coupled to the second node and the output may be coupled to a control terminal of the switch.

The voltage conversion circuit may further include a voltage regulator circuit including an input terminal coupled to the second node. The reference voltage may have a voltage level that may be sufficient to cause the voltage regulator to generate a stable output voltage at a desired voltage level. In some embodiments, the desired voltage level may be about 1.8 V.

The switch control circuit may further include a timer circuit connected between the output of the comparator and the switch. The timer circuit may be configured to generate an output pulse, and to supply the output pulse to the control terminal of the switch, in response to an output signal from the comparator indicating that a voltage at the second node is less than the reference voltage. A duration of the output pulse generated by the timer may be sufficient to charge the first capacitor to a voltage higher than the reference voltage.

The voltage conversion circuit may further include a controller that may be configured to disable the buck converter in response to a host electronic device being placed into a low current mode. The controller may be further configured to enable the buck converter in response to the host electronic device being placed into a high current mode.

The capacitor may include a first capacitor, and the switched capacitor voltage converter circuit may include a second capacitor, a first switch configured to switch a first terminal of the second capacitor between the first node and the second node, and a second switch configured to switch a second terminal of the second capacitor between the second node and ground.

The voltage conversion circuit may further include a switch control circuit coupled to the second node and configured to cause the first switch to connect the first terminal of the second capacitor to the first node and the second terminal of the second capacitor to the second node in response to a voltage at the second node falling below a reference voltage level.

The switched capacitor voltage converter circuit may include a battery coupled to the first node, an inductor coupled to the second node, a switch coupled between the battery and the inductor, a current measuring circuit configured to measure current through the inductor, and a switch control circuit configured to cause the switch to connect the battery to the inductor in response to a voltage at the second node falling below a reference voltage level.

Methods of performing voltage conversion for a host electronic device according to some embodiments include determining whether the host electronic device is in a high current mode or a low current mode, enabling a buck converter circuit in response to the device being in the high current mode, and disabling the buck converter circuit in response to the device being in the low current mode.

The methods may further include charging a first capacitor at an output voltage of the buck converter and charging second capacitor at a battery voltage level while the buck converter is enabled, and discharging the first capacitor when the buck converter is disabled.

The methods may further include, while the buck converter is disabled, connecting the second capacitor to the first capacitor in response to a voltage level on the first capacitor being reduced below a reference voltage level.

Connecting the second capacitor to the first capacitor may include comparing the voltage level on the first capacitor to the reference voltage level, generating a switch control signal in response to comparing the voltage level on the first capacitor to the reference voltage level, and changing a state of a switch that controllably connects the second capacitor to the first capacitor in response to the switch control signal.

Generating the switch control signal may include generating a comparison signal in response to comparing the voltage level on the first capacitor to the reference voltage level, and generating a control pulse in response to the comparison signal.

The methods may further include connecting a first capacitor and a second capacitor in parallel when the buck converter circuit is disabled and discharging the first and second capacitors until a voltage on the first and second capacitors is less than a reference voltage, and in response to the voltage on the first and second capacitors being less than the reference voltage, connecting the first and second capacitors in series to a battery and charging the first and second capacitors in series.

The methods may further include charging a capacitor while the buck converter circuit is enabled, discharging the capacitor while the buck converter circuit is disabled until a voltage on the capacitor is less than a reference voltage, and when the voltage on the capacitor is less than the reference voltage, connecting a battery to an inductor connected to the capacitor and charging the capacitor through the inductor.

A voltage converter circuit according to some embodiments includes a buck converter circuit having an input terminal coupled to a first node and having an output terminal coupled to a second node and configured to operate in a primary mode and a bypass mode, the buck converter may include a switch connected between a battery terminal input and an inductor, and a current measuring circuit coupled to the inductor and configured to measure current through the inductor, a capacitor coupled to the inductor, and a switch control circuit coupled to the capacitor and configured to cause the switch to connect the battery to the inductor in response to a voltage on the capacitor falling below a reference voltage. The current measuring circuit may be configured to cause the switch to disconnect the battery from the inductor in response to a current level in the inductor.

An electronic device according to some embodiments includes a battery terminal configured to receive a battery voltage having a battery voltage level, a communication module that is configured to operate in response to a supply voltage that may be less than the battery voltage level, and a voltage conversion circuit that is configured to convert the battery voltage to the supply voltage. The voltage conversion circuit includes a buck converter circuit having an input terminal coupled to a first node and having an output terminal coupled to a second node, a switched capacitor voltage converter circuit having an input coupled to the first node and an output coupled to the second node, and a controller that is configured to disable the buck converter in response to a host electronic device being placed into a low current mode.

DETAILED DESCRIPTION OF EMBODIMENTS

Figure 1:
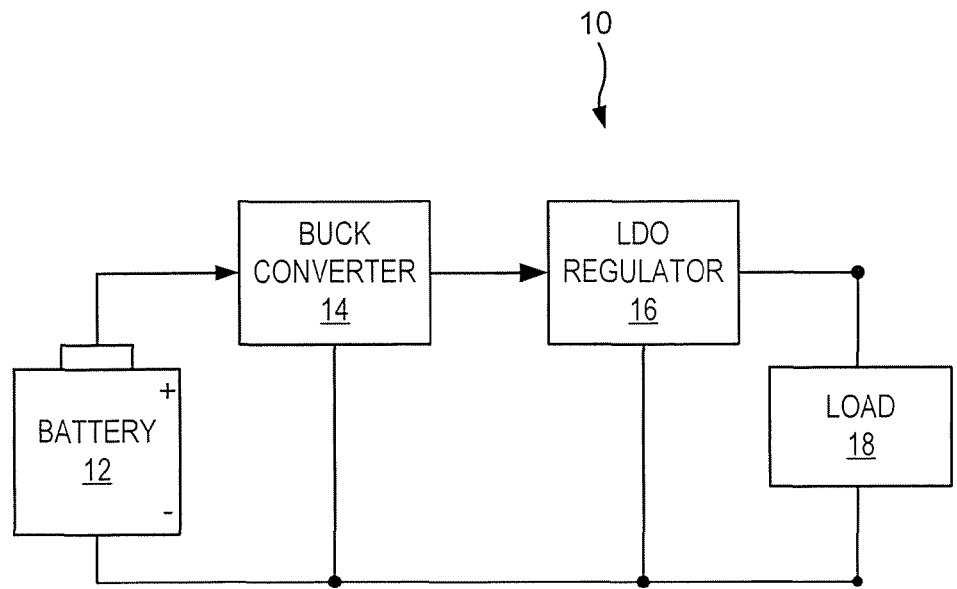
FIG. 1 illustrates power management circuitry.

Embodiments of the present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

Some embodiments of the present invention are described below with reference to flowchart illustrations and/or block diagrams of methods, systems and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

It can be desirable to supply electronic circuitry, such as CMOS circuitry, with a very stable supply voltage of about 1.8V. Circuitry used in a radio transceiver in particular can require a stable voltage supply, as any disturbance may affect the sensitivity of the receiver.

As explained above, a conventional power supply circuit for an electronic device (i.e., a host device) can include a two-stage circuit including a buck converter and a Low-Drop Out (LDO) regulator circuit. However, such an arrangement may have an unacceptably high level of leakage current under low load current conditions.

In many applications, it is known beforehand when a larger current will be needed from the power supply. For example, in a Bluetooth radio system, the transceiver may be selectively operated in a sleep mode and an active mode. From time to time, the host device may activate the transceiver from the sleep mode to receive and/or transmit information. The controller of the host device knows when the transceiver will be activated, and can thereby predict when a larger current will be needed from the power supply. It will be appreciated that the present invention is not limited to Bluetooth or other radio devices, but can be used in any system which operates, or which has components that operate, in a high-current active mode and a low-current sleep mode.

The information regarding the expected load current of a host device can be used to operate a power supply in two modes, one mode with performance adjusted for low load currents, and another mode with performance adjusted for high load currents. According to some embodiments, a switched capacitor voltage converter circuit, which can be used as a voltage converter during periods of low load current, is integrated with a buck converter circuit, which can used as a voltage converter during periods of high load current. The mode of operation of the voltage converter can be controlled via control signals output by a controller of the host device in which the voltage converter is employed.

FIG. 1 shows a conventional power management circuit 10 for an electronic device, such as a radio. A battery 12 supplies a terminal voltage as an input voltage to a high-efficiency step-down buck converter 14. The terminal voltage for the battery can be as high as 4.2 V for a fully charged battery. The terminal voltage is first reduced to a lower value by the buck converter 14 to an intermediate level of about 2 V. The design of buck converters is well known in the art and need not be described in detail herein.

Since the output voltage of the buck converter may still have an undesirably high level of voltage ripple, a second voltage conversion is carried out using a Low Drop-Out (LDO) regulator 16. The design of LDO regulators is well known in the art and need not be described in detail herein.

The final voltage output by the LDO regulator 16 to a load circuit 18, such as a radio transceiver, may be a stable 1.8 V, which may be required for some CMOS circuits to operate correctly. The input and output currents of the LDO regulator 16 are substantially the same. However, the ratio between the input and output currents of the buck converter 14 is proportional to the ratio between the output and input voltage thereof.

Figure 2:
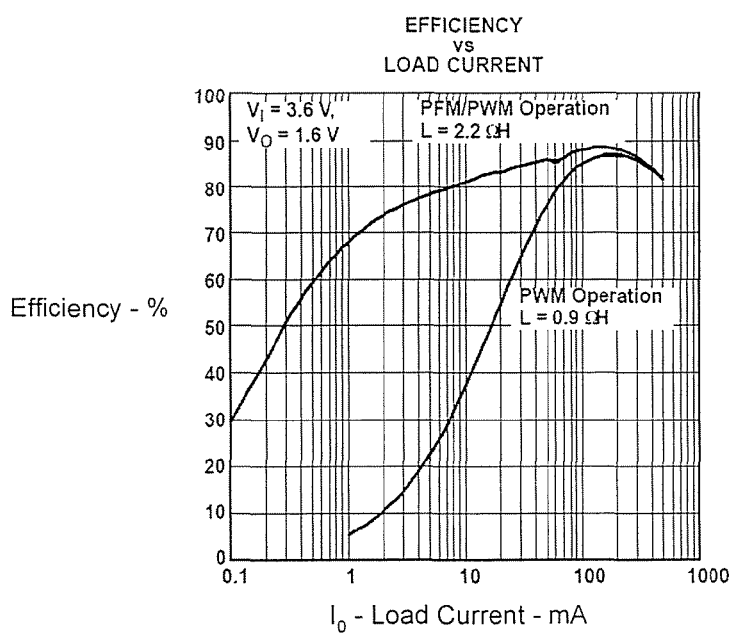
FIG. 2 illustrates efficiency curves of a typical buck converter operated in a pulse frequency modulation (PFM) mode or a pulse width modulation (PWM) mode.

Although the buck converter 14 has high power efficiency for high load currents, the efficiency may be worse for low load currents. For example, FIG. 2 shows an efficiency curve of a Texas Instruments (TI) model TPS623xx buck converter. For load currents in the 10-100 mA range, the efficiency is 85-90% when the chip is operating in the PFM (Pulse Frequency Modulation) mode. It will be appreciated that operating a buck converter in PFM mode is especially important for low load-current situations. Using only the PWM (Pulse Width Modulation) mode, the efficiency drops quickly when the load current is lower than 50 mA. The PFM mode in the TI chip already provides an improved efficiency for lower load currents. However, it can be seen from FIG. 2 that for very low load currents (e.g., below 100 µA) the efficiency can drop below 30%.

In some Bluetooth applications (such as headsets and watches), the host devices are "slave" devices that are operated primarily in a "sniff" mode. In this mode, the slave devices are still locked to a master device, but at a very low duty cycle. The slave devices only wake up once every 1 or 2 seconds to listen to the master transmission. Most of the time, the slave devices are in a sleep mode, in which only a real-time clock (such as a Low Power Oscillator, or LPO) and some timers are running. The sleep current is about 20-25 µA. With a 100% efficiency and a battery voltage that is twice the supply voltage, a discharge current on the battery of 10-12 µA would be expected. Instead, a 50 µA discharge current can be measured, which is believed to be a result of the limited efficiency of the buck converter 14 (including the leakage currents in the buck converter 14), despite the fact that the buck converter 14 is operated in the more efficient PFM mode.

Figure 3A:
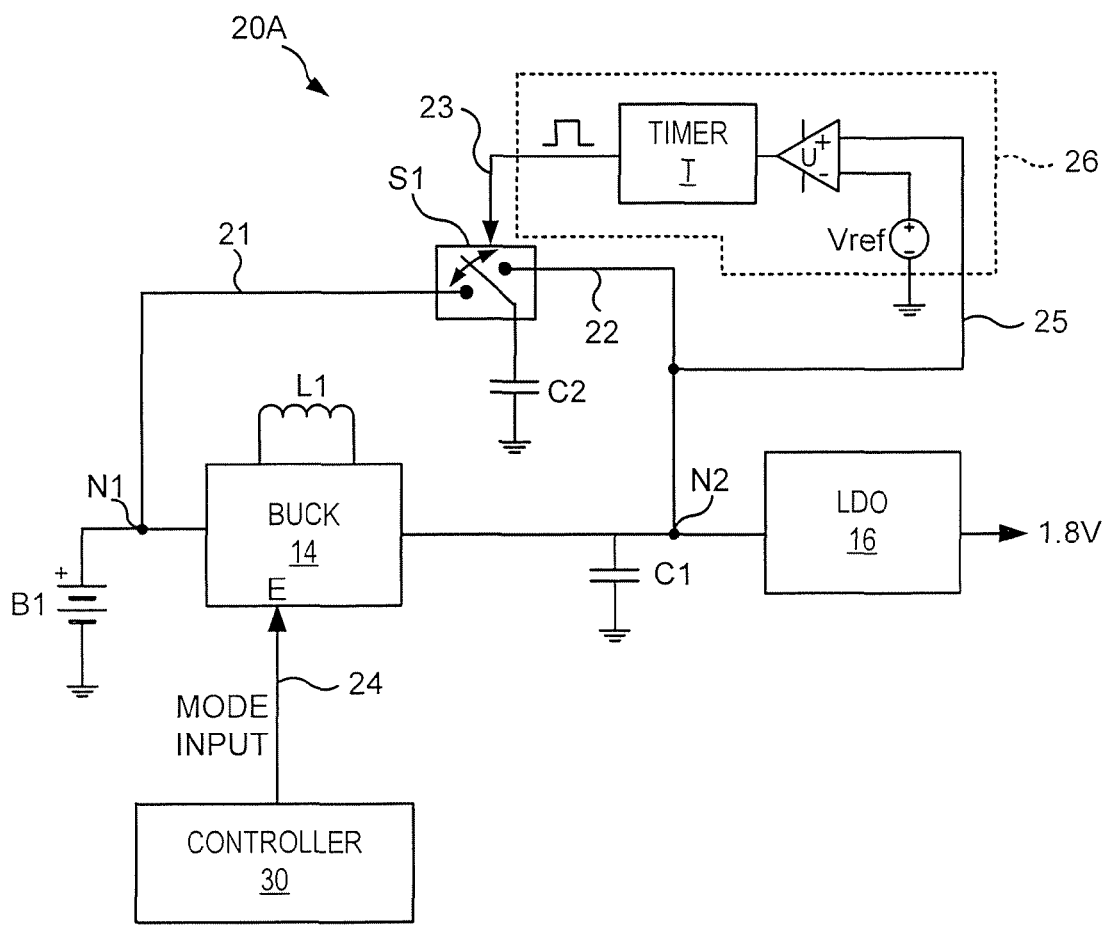
FIGS. 3A, 3B and 3C illustrate voltage conversion circuits according to some embodiments.

A voltage converter circuit 20A according to some embodiments is illustrated in FIG. 3A. The voltage converter circuit 20A can be configured according to some embodiments to operate efficiently in both a low current sleep mode and a high current active mode. As shown in FIG. 3A, the voltage converter circuit 20A includes a buck converter 14 having an input terminal coupled at a first node N1 to a supply terminal of a battery B1. An output terminal of the buck converter 14 is coupled to an input terminal of a LDO regulator 16 at a second node N2. The buck converter 14 includes an enable input E. A controller 30 supplies a MODE INPUT control signal to the enable input E of the buck converter 14 via a line 24. Accordingly, the buck converter 14 can be enabled/disabled by the MODE INPUT control signal output by the controller 30. When the buck converter 14 is disabled, the input of the buck converter 14 is placed in a high impedance state and the output of the buck converter 14 is permitted to float. The inductor L1 is a conventional element of a buck converter, and is typically supplied as a separate component.

A first capacitor C1 is coupled between the input of the LDO regulator 16 at node N2, and ground. A second capacitor C2 is coupled between a switch S1 and ground. The switch S1 controllably connects the second capacitor C2 to the supply terminal of the battery B1 via a line 21 or to the first capacitor C1, at node N2 via a line 22.

The switch S1 is controlled by a switch control circuit 26 including a comparator U, a timer T, and a reference voltage Vref. A noninverting input (+) of the comparator U is coupled to the input terminal of the LDO regulator 16 at node N2 via a line 25, while an inverting input (−) of the comparator U is coupled to the reference voltage Vref. An output of the comparator U is coupled to an input of the timer T, and an output of the timer T is coupled to the switch S1 via a control line 23. The first and second capacitors C1, C2 and the switch control circuit 26 provide a switched capacitor voltage converter that is operational when the buck converter 14 is disabled, as described below.

When an application program operating in a host device requests an operation to be performed, the controller 30 can determine whether the requested operation will place the host device into a high current mode (e.g., an active mode) or a low current mode (e.g. a sleep mode). In response to this determination, a decision is made to use the buck converter 14 for the high current mode or the switched capacitor converter for the low current mode. If the controller determines that the host device is or will be in a low current consumption mode, the controller outputs a MODE INPUT signal on line 24 that causes the buck converter 14 to be shut down (i.e. disabled). This can reduce and/or eliminate the leakage current in the buck converter 14. Furthermore, when the buck converter 14 is disabled, the switched capacitor voltage converter is activated automatically, as described below.

As described above, the switched capacitor voltage converter includes a first capacitor C1 and a second capacitor C2, a switch S1 that determines to what node C2 is connected, a comparator U and a timer T. The second capacitor C2 is normally connected to the battery B1. Hence, while the buck converter 12 is enabled, the second capacitor C2 remains charged with a voltage across the second capacitor C2 equal to the battery voltage. The first capacitor C1 is charged by the output of the buck converter 14.

When the buck converter 14 is disabled, the voltage across the first capacitor C1 will slowly drop due to the small current the host device is using. The voltage reference Vref outputs a voltage that is just high enough to preserve a regulated 1.8V output voltage at the output of the LDO. When the comparator U detects that the input voltage to the LDO is lower than the voltage reference Vref, the comparator outputs a signal that is converted by the timer T into an output pulse. The duration of the output pulse should provide enough time for the charge transfer from the second capacitor C2 to the first capacitor C1 to occur. The final voltage level on the first capacitor C1 depends on the battery voltage B1, the reference voltage Vref, and the ratio C1/C2. In the embodiments of FIG. 3A, C1 may be much larger than C2. If the output pulse is too long, C1 and C2 will be discharged in parallel, and if it is too short, the first capacitor C1 may not become sufficiently charged. However, the precise duration of the output pulse may vary.

The output pulse causes the switch S1 to momentarily connect the second capacitor C2 to the first capacitor C1 via the line 22. At this time, a charge transfer will take place. Part of the charge stored in the second capacitor C2 will flow into the first capacitor C1, which will raise the voltage across the first capacitor C1. The final voltage across the parallel combination of C1 and C2 will be determined by the ratio of the capacitances C1 and C2, and is a degree of freedom in the design.

After a predetermined time (i.e., the output pulse duration) when the charge redistribution is complete, the capacitor C2 is connected again to the battery B1, and it will charge again. When the comparator U again detects too low of a voltage at node N2, the process will repeat itself. While the host device remains in a low-current mode, the repetition rate may automatically adjust itself so that the circuit can provide the actual (low) level current needed by the host device. In practical implementations, the comparator U and reference voltage Vref may be implemented using some existing circuitry already present in the LDO.

Therefore, according to some embodiments, the standby time of low power electronic devices that operate in both an active mode and a standby mode can be prolonged considerably.

Figure 4:
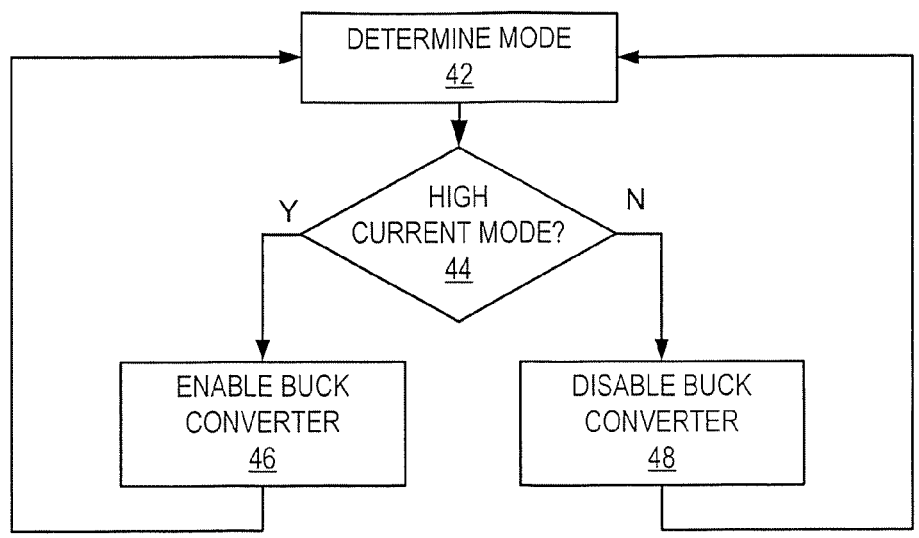
FIGS. 4, 5A, 5B and 5C are flowcharts illustrating operations according to some embodiments.

FIG. 4 is a flowchart illustrating operations according to some embodiments. Referring to FIGS. 3A and 4, a controller 30 detects/predicts the operational mode of a host electronic device, such as a portable radio, in which the voltage conversion circuit 20 is located (Block 42). That is, the controller 30 determines whether the host device is in, or is about to be placed in, a high current mode (e.g. an active mode) or a low current mode (e.g. a sleep mode). If it is determined that the host device is in, or is about to be placed in, a high current mode (Block 44), then the buck converter 14 is enabled via a MODE INPUT signal on the control line 24 to the enable input E of the buck converter 14 (Block 46). When the buck converter 14 is enabled, the first capacitor C1 is charged at an output voltage level of the buck converter 14 and the second capacitor C2 is charged at the voltage level of the battery B1.

Otherwise, if it is determined that the host device is in, or is about to be placed in, a low current mode, the buck converter 14 is disabled via a MODE INPUT signal provided on the control line 24 to the enable input E of the buck converter 14 (Block 48). After the buck converter 14 has been enabled or disabled, control returns to Block 42, and the controller again detects/predicts the operational mode of the device.

Figure 5A:
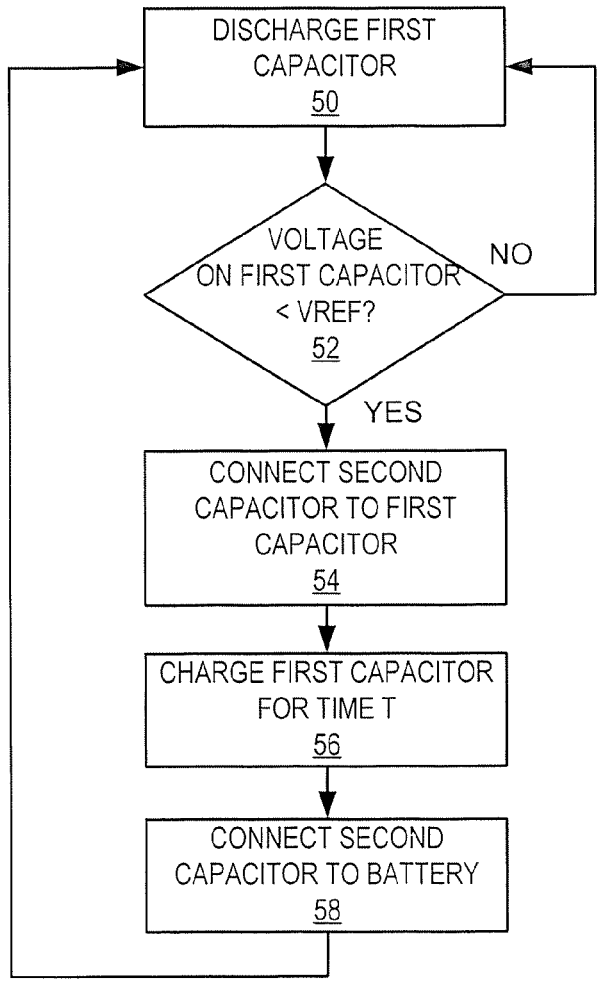

FIG. 5A illustrates some operations that may be performed when the buck converter 14 is disabled (i.e. when the host device is in a low current mode). Referring to FIG. 5A, when the buck converter 14 is disabled, the first capacitor is discharged into the LDO regulator 16 (Block 50). Furthermore, when the buck converter 14 is disabled and a voltage level on the first capacitor C1 is reduced below a reference voltage level Vref (Block 52), the second capacitor C2 is connected to the first capacitor C1 via the switch S1 (Block 54). The stored charge in the second capacitor C2 is transferred to the first capacitor C1, thereby charging the first capacitor C1 (Block 56). When sufficient charge has been transferred from the first to the second capacitor, the second capacitor is connected to the battery B1 (Block 58).

The second capacitor C2 may be connected to the first capacitor C1 by comparing the voltage level on the first capacitor C1 to the reference voltage level Vref and generating a switch control signal in response to the comparison. A state of the switch S1 may be changed in response to the switch control signal to controllably connect the second capacitor C2 to the first capacitor C1. As described above, a control pulse may be generated by a timer T in response to the comparison, and the control pulse may be used to control the state of the switch S1.

Figure 3B:
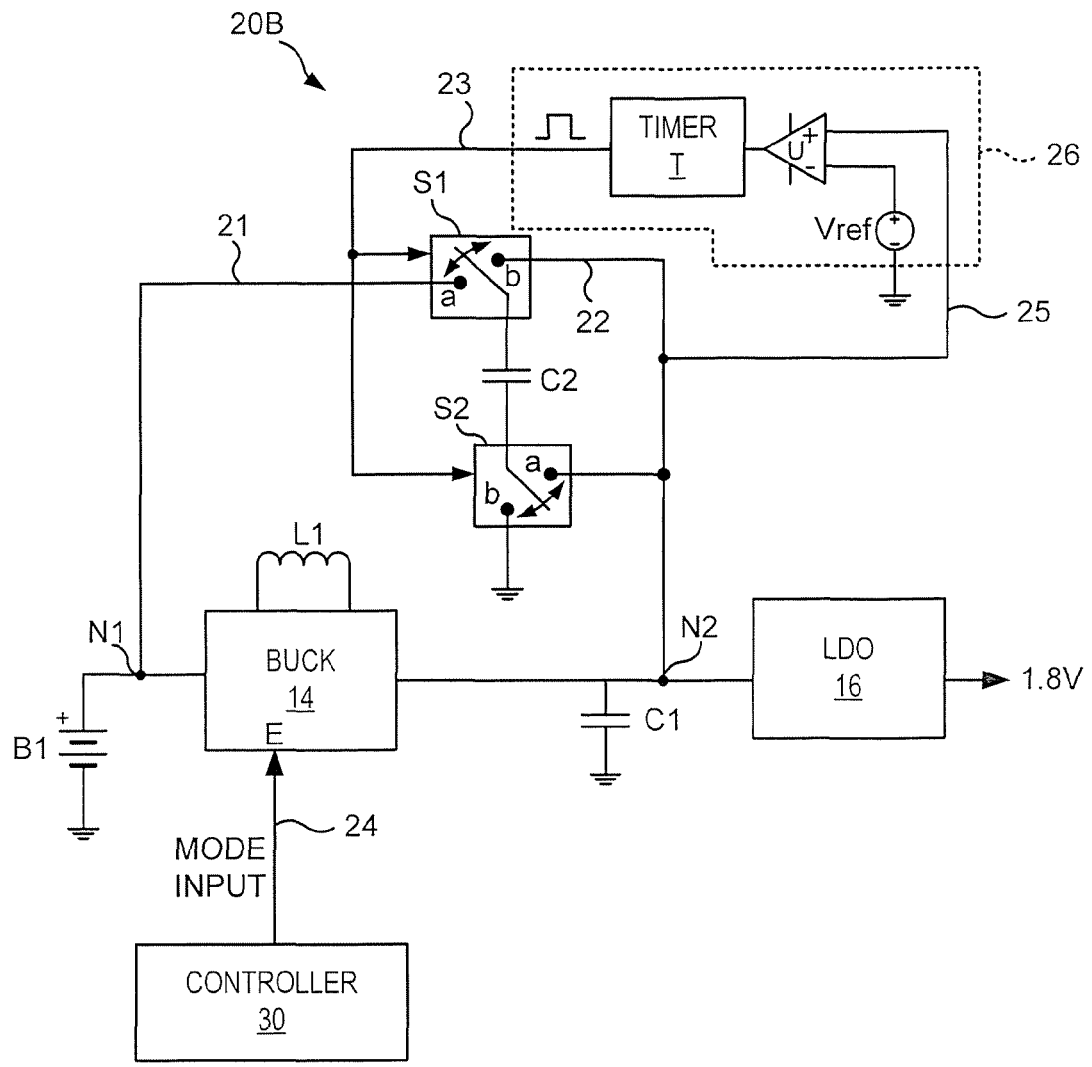

A voltage converter circuit 20B according to further embodiments is illustrated in FIG. 3B. Elements of the voltage converter circuit 20B that are similar to elements of the voltage converter circuit 20A of FIG. 3A have the same reference numbers.

Compared with the voltage converter circuit 20A of FIG. 3A, the voltage converter circuit 20B of FIG. 3B includes an extra switch S2. Switches S1 and S2 operate simultaneously and are both controlled by a control line 23 on which the output pulse of the timer T is output. The switches S1 and S2 are normally both in position "b," in which the first switch S1 connects a terminal of the second capacitor C2 to the node N2, and the second switch S2 connects another terminal of the second capacitor C2 to ground. As a result, the first and second capacitors C1 and C2 are connected in parallel. When the buck converter 14 is enabled, the first and second capacitors C1 and C2 are charged at the output voltage of the buck converter 14.

When the buck converter 14 is disabled, the first and second capacitors C1 and C2 are both discharged by the small input current of the LDO 16. When the comparator U detects that the input voltage to the LDO at node N2 is lower than the voltage reference Vref, the comparator outputs a signal that is converted by the timer T into an output pulse on control line 23. The output pulse on control line 23 causes the switches S1 and S2 to switch to position "a" in which one terminal of the second capacitor C2 is coupled to the battery B1 and the other terminal is coupled to node N2. The first and second capacitors C1 and C2 are then connected in series between the battery B11 and ground. As a result, the first and second capacitors C1 and C2 are charged by the battery B1. If the capacitances C1 and C2 are nominally the same, the capacitances are both charged to half the battery voltage. When the output pulse provided by the timer T ends, the switches S1 and S2 are turned back to the "b" position, and the capacitors C1 and C2 are placed in parallel, now charged to half the battery voltage.

In the embodiments of FIG. 3B, the capacitors C1 and C2 are nominally of the same value. As a result, the voltage across each of the capacitors C1 and C2 after charging is half the battery voltage. Modifications to the circuit 20B shown in FIG. 3B are possible if other voltage ratios are desired. For example, a 2/3 ratio can be achieved by placing two banks of each three capacitors in series. After charging, three banks, with each bank having two capacitors in series, can be connected in parallel.

Figure 5B:
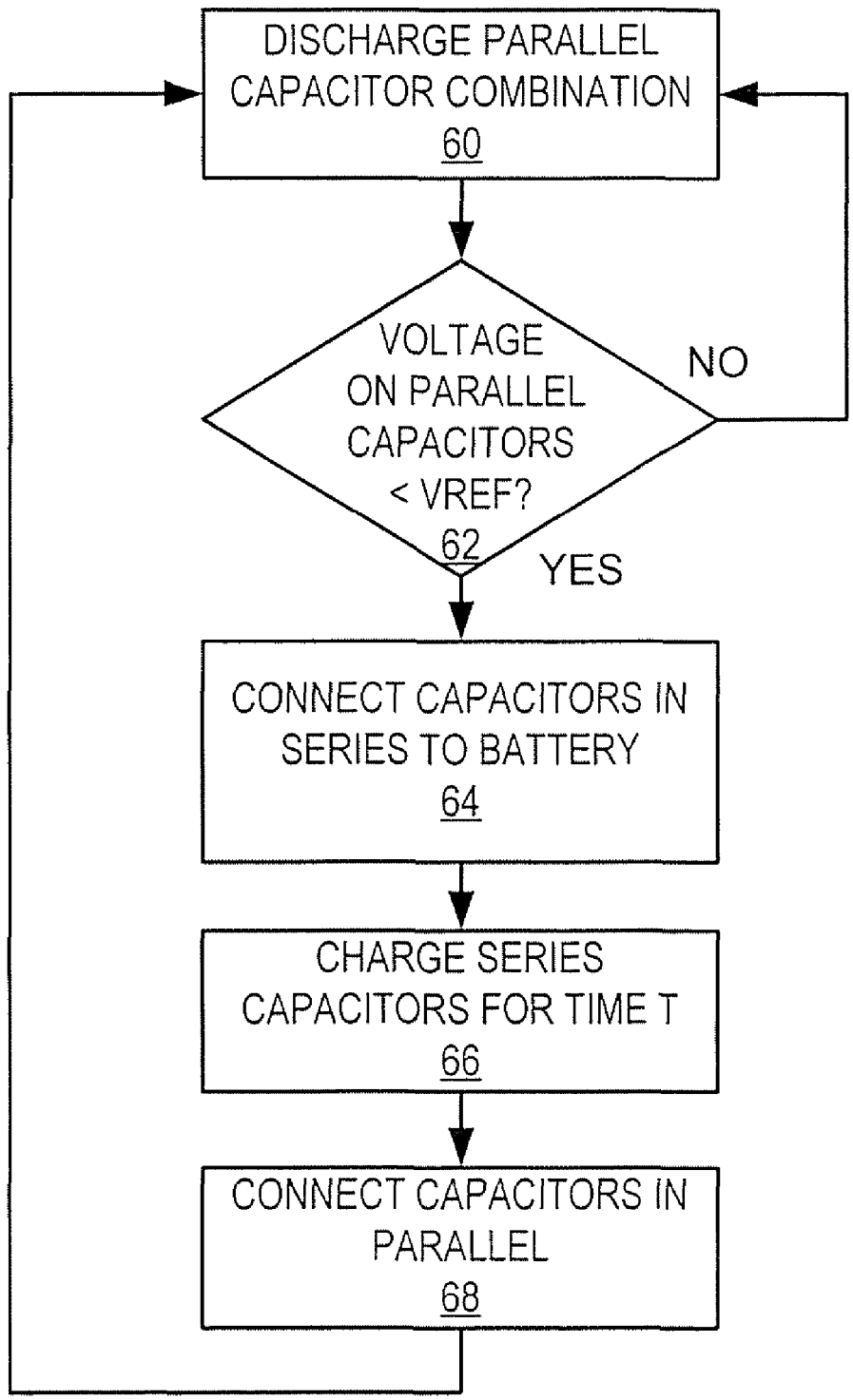

Operations of the voltage converter circuit 3B when the buck converter 14 is disabled are illustrated in FIG. 5B. Referring to FIGS. 3B and 5B, when the buck converter 14 is disabled (i.e. when the host device is in a low current mode), the parallel combination of capacitors C1 and C2 is discharged into the LDO regulator 16 (Block 60). Furthermore, when the buck converter 14 is disabled and a voltage level on the first and second capacitors C1, C2 is reduced below a reference voltage level Vref (Block 62), the second capacitor C2 is connected in series to the first capacitor C1 via the switch S2 and to the battery via the switch S1 (Block 64). The first and second capacitors are charged by the battery B1 (Block 66). When sufficient charge has been transferred from the battery B1 to first and second capacitors C1, C2, the second capacitor C2 is connected in parallel to the first capacitor C1 (Block 68).

Figure 3C:
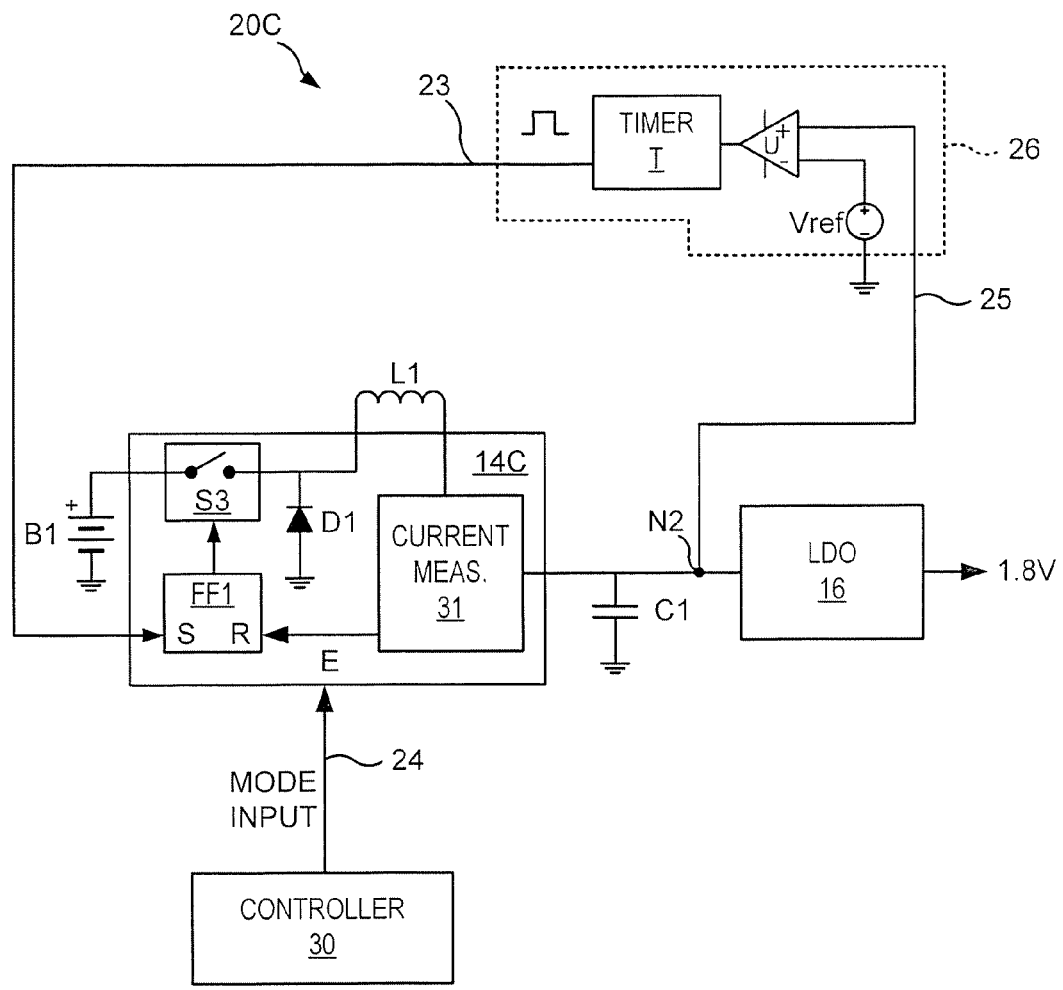

A voltage converter circuit 20C according to further embodiments is illustrated in FIG. 3C. Elements of the voltage converter circuit 20C that are similar to elements of the voltage converter circuit 20A of FIG. 3A have the same reference numbers. In the embodiments of FIG. 3C, the buck converter 14C may operate in a normal mode and a bypass mode in response to a MODE INPUT signal 24. As shown in FIG. 3C, the buck converter 14C of the voltage converter circuit 20C includes a switch S3, a diode D1, a data latch, such as a set/reset flip-flop FF1, and a current measuring circuit 31. The timer output pulse is provided on the control line 23 to the SET input S of the S/R flip-flop FF1. The battery B1 is connected to the switch S3, which is controlled by an output of the S/R flip-flop FF1. The current measuring circuit 31 measures current flowing through the inductor L1, and provides an input to the RESET input R of the S/R flip-flop FF1 in response to the measured current.

Figure 5C:
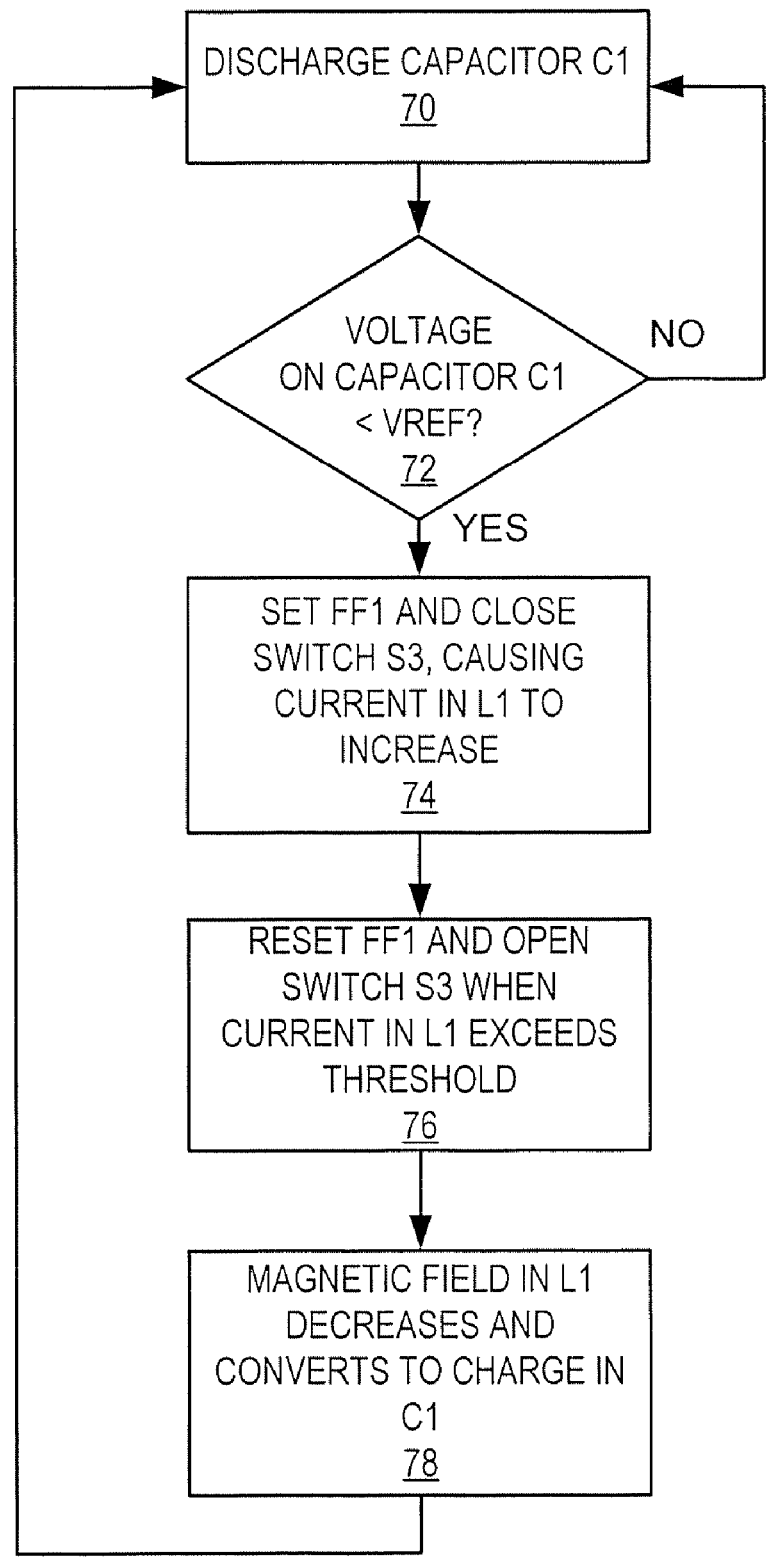

Operations of the voltage converter circuit 20C are illustrated in FIG. 5C. Referring to FIGS. 3C and 5C, when the host device enters a low-current mode, the buck converter 14C is placed into a bypass mode in which voltage conversion is performed as follows. The voltage across the first capacitor C1 will slowly drop due to the small current the host device is using (Block 70). When the comparator U detects that the input voltage to the LDO regulator 16 is lower than the voltage reference Vref (Block 72), the comparator U outputs a signal that is converted by the timer T into an output pulse. This output pulse will activate the flip-flop FF1 via the SET input S (Block 74). The activated flip-flop FF1 will turn ON the switch S3, and a linearly increasing current will start to flow from battery B1 through the switch S3, inductor L1 and current measurement circuit 31, and into the capacitor C1. The voltage across C1 will start to rise and energy will be built up in the magnetic field of inductor L1.

When the current through the inductor L1 has reached a predetermined maximum value, which is dependent on the current capability of the switch S3 and the inductor L1, the current measurement circuit 31 will RESET the flip-flop FF1 by applying a RESET signal to the RESET input R of the flip-flip FF1 (Block 76). In response to being reset, the flip-flop FF1 will turn OFF (i.e., open) the switch S3, causing current to run through the diode D1, and the energy of the magnetic field in inductor L1 to be converted to charge in capacitor C1 (Block 78). The voltage across capacitor C1 will now have increased, and the process will restart itself when the voltage at node N2 has dropped again to below the reference voltage Vref.

The actual repetition rate of this process is automatically adjusted by the current the host device is using. This may be contrasted to the normal "PWM" operating mode of conventional buck converters, because then the switching frequency is constant and only the duty-cycle to switch S3 is adjusted by an control loop. It is also different from the low power "PFM" operating mode of conventional buck converters, because then the buck converter will operate for small periods of time in PWM mode and is disabled for longer periods of time.

In some embodiments, circuitry present in the LDO regulator 16 can be employed to implement the comparator function in the switch control circuit 26 in FIGS. 3A, 3B and 3C. For example, a comparator and a voltage reference are part of the closed-loop system in the LDO regulator 16 to regulate the output voltage to a stable level. The feedback signal used for controlling the conversion factor between the input voltage and the output voltage can be reused as input to the timer T. As a result, very little additional circuitry and/or power consumption may be required to implement a voltage converter circuit according to some embodiments.

Figure 6:
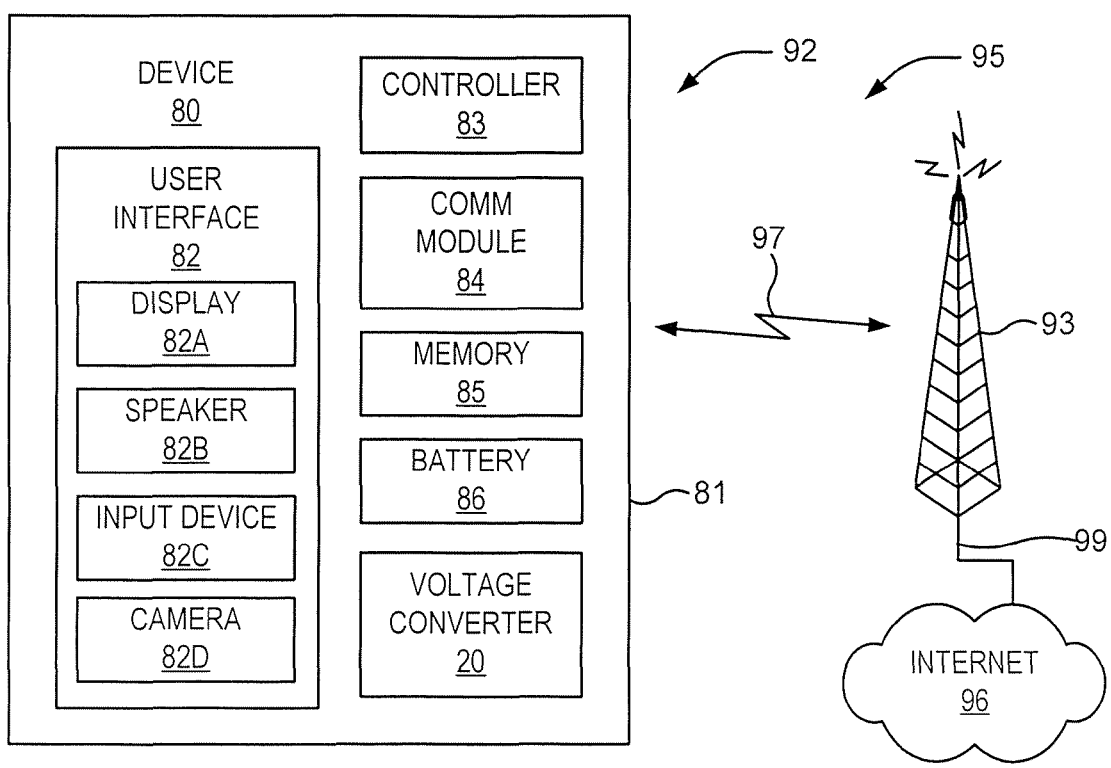
FIG. 6 is a schematic block diagram of a host electronic device and associated communication network according to some embodiments.

An exemplary host electronic device 80 in accordance with some embodiments of the present invention is illustrated in FIG. 6. It will be appreciated that although embodiments of the invention are illustrated in connection with a wireless communication terminal, the invention may include wired mobile and/or non-mobile communication terminals and other electronic devices and methods. The portable electronic device 80 can be configured to communicate data with one or more other wireless terminals over a direct wireless communication interface therebetween, over another wireless communication interface through one or more cellular base stations, and/or over another wireless communication interface through a wireless local area network (WLAN) router. It will be appreciated that the portable electronic device 80 need not be a cellular telephone, but could be any other type of portable electronic device that includes a display screen, such as a personal digital assistant (PDA), handheld GPS unit, or other type of electronic device.

The portable electronic device 80 may be a mobile radiotelephone forming a part of a radiotelephone communication system 92 as illustrated in FIG. 6. The system 92 includes the portable electronic device 80 and a base transceiver station 93, which is part of a wireless communications network 95. In some embodiments of the present invention, the base transceiver station 93 includes the radio transceiver(s) that define an individual cell in a cellular network and communicates with the portable electronic device 80 (via an interface 97) and other mobile terminals in the cell using a radio-link protocol. It will be understood that, in some embodiments of the present invention, many base transceiver stations may be connected through, for example, a mobile switching center and other devices to define the wireless communications network. The base station transceiver 93 may be connected to a data communications network 96, such as the Internet, via a communication link 99. It will be appreciated that the communication link 99 may include elements of the wireless communications network and/or one or more gateways, routers, or other communication nodes.

The portable electronic device 80 in the illustrated embodiments includes a portable housing assembly 81, a controller circuit 83 ("controller"), a communication module 84, a memory 85, a battery 86 and a voltage converter circuit 20 that converts a voltage output by the battery 86 to a voltage level that is usable by the device 80. The voltage converter circuit 20 may have a configuration as illustrated in FIGS. 3A to 3C, and/or may operate in accordance with the flowcharts of FIGS. 4, 5A, 5B and/or 5C.

The portable electronic device 80 further includes a user interface 82 (i.e., a man machine interface) including a display screen 82A, a speaker 82B, one or more input devices 82C, and a camera 82D. The input device 82C may include a keyboard, which may be a numerical keyboard including keys that correspond to a digit as well as to one or more characters, such as may be found in a conventional wireless telephone. In some embodiments, the input device 82C may include a full QWERTY keyboard that may be operated, for example, using thumbs. More than one input device 82C may be included.

The camera 82D can include a digital camera having a CCD (charge-coupled device), CMOS (complementary MOS) or other type of image sensor, and can be configured to record still images and/or moving images and convert the images into a format suitable for display and/or manipulation.

The display screen 82A may be any suitable display screen assembly. For example, the display screen 82A may be a liquid crystal display (LCD) with or without auxiliary lighting (e.g., a lighting panel). In some cases the portable electronic device 80 may be capable of playing video content of a particular quality. For example, a portable electronic device 80 may be configured to display a video stream having a particular aspect ratio, such as 16:9 or 4:3. Thus, a portable electronic device 80 may be capable of displaying video in one or more different display formats.

The display screen 82A can include a touch-sensitive display screen that is configured to detect touches and convert the detected touches into positional information that can be processed by the controller 83.

The user interface 82 may include any suitable input device(s) including, for example, a touch activated or touch sensitive device (e.g., a touch screen), a joystick, a keyboard/keypad, a dial, a directional key or keys, and/or a pointing device (such as a mouse, trackball, touch pad, etc.). The speaker 82B generates sound responsive to an input audio signal. The user interface 82 can also include a microphone coupled to an audio processor that is configured to generate an audio data stream responsive to sound incident on the microphone.

The controller 83 may support various functions of the portable electronic device 80, and can be any commercially available or custom microprocessor. In use, the controller 83 of the portable electronic device 80 may generate and display an image on the display screen 82A. In some embodiments, however, a separate signal processor and/or video chip (not shown) may be provided in the portable electronic device 80 and may be configured to generate a display image on the display screen 82A. Accordingly, the functionality of the controller 83 can be distributed across multiple chips/devices in the portable electronic device 80.

The memory 85 is configured to store digital information signals and data such as a digital multimedia files (e.g., digital audio, image and/or video files).

The communication module 84 is configured to communicate data over one or more wireless interfaces to another remote wireless terminal as discussed herein. The communication module 84 can include a cellular communication module, a direct point-to-point connection module, and/or a WLAN module.

The portable electronic device 80 can include a cellular communication module that allows the device 80 to communicate via the base transceiver station(s) 93 of the network 95 using one or more cellular communication protocols such as, for example, Advanced Mobile Phone Service (AMPS), ANSI-136, Global Standard for Mobile (GSM) communication, General Packet Radio Service (GPRS), enhanced data rates for GSM evolution (EDGE), code division multiple access (CDMA), wideband-CDMA, CDMA2000, and Universal Mobile Telecommunications System (UMTS). The cellular base stations may be connected to a Mobile Telephone Switching Office (MTSO) wireless network, which, in turn, can be connected to a PSTN and/or another network.

A direct point-to-point connection module may include a direct RF communication module or a direct IR communication module. The direct RF communication module may include a Bluetooth module. With a Bluetooth module, the portable electronic device 80 can communicate via an ad-hoc network through a direct point-to-point interface.

With a WLAN module, the device 80 can communicate through a WLAN using a communication protocol that may include, but is not limited to, 802.11a, 802.11b, 802.11e, 802.11g, and/or 802.11i.

The communication module 84 can include a transceiver typically having a transmitter circuit and a receiver circuit, which respectively transmit outgoing radio frequency signals (e.g., to the network 95, a router or directly to another terminal) and receive incoming radio frequency signals (e.g., from the network 95, a router or directly to another terminal), such as voice and data signals, via an antenna. The communication module 84 may include a short range transmitter and receiver, such as a Bluetooth transmitter and receiver. The antenna may be an embedded antenna, a retractable antenna or any antenna known to those having skill in the art without departing from the scope of the present invention. The radio frequency signals transmitted between the portable electronic device 80 and the network 95, router or other terminal may include both traffic and control signals (e.g., paging signals/messages for incoming calls), which are used to establish and maintain communication with another party or destination. The radio frequency signals may also include packet data information, such as, for example, cellular digital packet data (CDPD) information. In addition, the transceiver may include an infrared (IR) transceiver configured to transmit/receive infrared signals to/from other electronic devices via an IR port.

The communication module 84 can selectively operate in a sleep mode or an active mode, depending on the requirements of a protocol being employed. In a sleep mode, the communication module 84 can draw less current from the voltage converter 20. The controller 83 can cause the communication module 84 to wake up from the sleep mode from time to time to listen for transmissions from a remote device.

The portable electronic device 80 may also be configured to electrically communicate with another terminal via a wireline or cable for the transmission of digital communication signals therebetween.

Although FIG. 6 illustrates an exemplary hardware/software architecture that may be used in mobile terminals and/or other electronic devices, it will be understood that the present invention is not limited to such a configuration but is intended to encompass any configuration capable of carrying out operations described herein. For example, although the memory 85 is illustrated as separate from the controller 83, the memory 85 or portions thereof may be considered as a part of the controller 83. More generally, while particular functionalities are shown in particular blocks by way of illustration, functionalities of different blocks and/or portions thereof may be combined, divided, and/or eliminated. Moreover, the functionality of the hardware/software architecture of FIG. 6 may be implemented as a single processor system or a multi processor system in accordance with various embodiments of the present invention.

In the drawings and specification, there have been disclosed typical embodiments of the invention and, although specific terms are employed, they are used in a generic and descriptive sense only and not for purposes of limitation, the scope of the invention being set forth in the following claims.

That which is claimed is:

1. A voltage conversion circuit for a host electronic device, comprising:
    a buck converter circuit having an input terminal coupled to a first node and having an output terminal coupled to a second node; and
    a switched capacitor voltage converter circuit having an input coupled to the first node and an output coupled to the second node;
    wherein the buck converter circuit is configured to be selectively enabled and disabled in response to a control signal, and wherein the switched capacitor voltage converter circuit is configured to repetitively switch between charging a capacitor through the first node and discharging the capacitor through the second node while the buck converter circuit is disabled and to cease discharging the capacitor through the second node while the buck converter is enabled.

2. The voltage conversion circuit of claim 1, wherein the buck converter circuit comprises an enable input coupled to a control line, and wherein the buck converter circuit is configured to be selectively enabled and/or disabled in response to a control signal on the control line.

3. The voltage conversion circuit of claim 1, wherein the capacitor comprises a second capacitor, and wherein the switched capacitor voltage converter circuit comprises a first capacitor coupled between the second node and ground and a switch configured to controllably connect the second capacitor to the first node or to the second node.

4. The voltage conversion circuit of claim 3, wherein the switched capacitor voltage converter circuit further comprises a switch control circuit that is configured to control a state of the switch.

5. The voltage conversion circuit of claim 4, wherein the switch control circuit comprises:
    a comparator including a noninverting input, an inverting input, and an output, wherein the noninverting input is coupled to the second node and wherein the output is coupled to a control terminal of the switch; and
    a reference voltage coupled to the inverting input of the comparator.

6. The voltage conversion circuit of claim 5, further comprising a voltage regulator circuit including an input terminal coupled to the second node, wherein the reference voltage has a voltage level that is sufficient to cause the voltage regulator to generate a stable output voltage at a desired voltage level.

7. The voltage conversion circuit of claim 5, wherein the switch control circuit further comprises a timer circuit connected between the output of the comparator and the switch, wherein the timer circuit is configured to generate an output pulse, and to supply the output pulse to the control terminal of the switch, in response to an output signal from the comparator indicating that a voltage at the second node is less than the reference voltage.

8. The voltage conversion circuit of claim 7, wherein a duration of the output pulse generated by the timer is sufficient to charge the first capacitor to a voltage higher than the reference voltage.

9. The voltage conversion circuit of claim 1, further comprising a controller that is configured to disable the buck converter in response to a host electronic device being placed into a low current mode and to enable the buck converter in response to the host electronic device being placed into a high current mode.

10. The voltage conversion circuit of claim 1, wherein the capacitor comprises a first capacitor, and wherein the switched capacitor voltage converter circuit comprises:
    a second capacitor;
    a first switch configured to switch a first terminal of the second capacitor between the first node and the second node; and
    a second switch configured to switch a second terminal of the second capacitor between the second node and ground.

11. The voltage conversion circuit of claim 10, further comprising a switch control circuit coupled to the second node and configured to cause the first switch to connect the first terminal of the second capacitor to the first node and the second terminal of the second capacitor to the second node in response to a voltage at the second node falling below a reference voltage level.

12. The voltage conversion circuit of claim 1, wherein the switched capacitor voltage converter circuit comprises:
   a battery coupled to the first node;
   an inductor coupled to the second node;
   a switch coupled between the battery and the inductor;
   a current measuring circuit configured to measure current through the inductor; and
   a switch control circuit configured to cause the switch to connect the battery to the inductor in response to a voltage at the second node falling below a reference voltage level.

13. A method performing voltage conversion for a host electronic device, comprising:
   determining whether the host electronic device is in a high current mode or a low current mode;
   enabling a buck converter circuit in response to the device being in the high current mode; and
   disabling the buck converter circuit in response to the device being in the low current mode.

14. The method of claim 13, further comprising:
   charging a first capacitor at an output voltage of the buck converter and charging second capacitor at a battery voltage level while the buck converter is enabled; and
   discharging the first capacitor when the buck converter is disabled.

15. The method of claim 14, further comprising:
   while the buck converter is disabled, connecting the second capacitor to the first capacitor in response to a voltage level on the first capacitor being reduced below a reference voltage level.

16. The method of claim 15, wherein connecting the second capacitor to the first capacitor comprises:
   comparing the voltage level on the first capacitor to the reference voltage level;
   generating a switch control signal in response to comparing the voltage level on the first capacitor to the reference voltage level; and
   changing a state of a switch in response to the switch control signal, wherein the switch controllably connects the second capacitor to the first capacitor.

17. The method of claim 16, wherein generating the switch control signal comprises generating a comparison signal in response to comparing the voltage level on the first capacitor to the reference voltage level; and
   generating a control pulse in response to the comparison signal.

18. The method of claim 13, further comprising:
   connecting a first capacitor and a second capacitor in parallel when the buck converter circuit is disabled and discharging the first and second capacitors until a voltage on the first and second capacitors is less than a reference voltage; and
   in response to the voltage on the first and second capacitors being less than the reference voltage, connecting the first and second capacitors in series to a battery and charging the first and second capacitors in series.

19. The method of claim 13, further comprising:
   charging a capacitor while the buck converter circuit is enabled;
   discharging the capacitor while the buck converter circuit is disabled until a voltage on the capacitor is less than a reference voltage; and
   when the voltage on the capacitor is less than the reference voltage, connecting a battery to an inductor connected to the capacitor and charging the capacitor through the inductor.

20. An voltage converter circuit, comprising:
   a buck converter circuit having an input terminal coupled to a first node and having an output terminal coupled to a second node and configured to operate in a primary mode and a bypass mode; wherein the buck converter comprises a switch connected between a battery terminal input and an inductor, and a current measuring circuit coupled to the inductor and configured to measure current through the inductor;
   a capacitor coupled to the inductor; and
   a switch control circuit coupled to the capacitor and configured to cause the switch to connect the battery to the inductor in response to a voltage on the capacitor falling below a reference voltage;
   wherein the current measuring circuit is configured to cause the switch to disconnect the battery from the inductor in response to a current level in the inductor.

* * * * *